(12) United States Patent
Castillo

(10) Patent No.: US 11,694,493 B2
(45) Date of Patent: Jul. 4, 2023

(54) SYSTEMS FOR LIGHTING ANIMATION TO DISPLAY VEHICLE CONDITION

(71) Applicant: GM GLOBAL TECHNOLOGY OPERATIONS LLC, Detroit, MI (US)

(72) Inventor: Gregory M. Castillo, Windsor (CA)

(73) Assignee: GM Global Technology Operations LLC, Detroit, MI (US)

(*) Notice: Subject to any disclaimer, the term of this patent is extended or adjusted under 35 U.S.C. 154(b) by 212 days.

(21) Appl. No.: 17/176,696

(22) Filed: Feb. 16, 2021

(65) Prior Publication Data
US 2022/0262178 A1 Aug. 18, 2022

(51) Int. Cl.
*G07C 5/08* (2006.01)
*F21S 41/663* (2018.01)
*B60Q 1/48* (2006.01)
*B60Q 1/50* (2006.01)

(52) U.S. Cl.
CPC ............. *G07C 5/0825* (2013.01); *B60Q 1/48* (2013.01); *B60Q 1/50* (2013.01); *F21S 41/663* (2018.01); *B60Q 2400/50* (2013.01)

(58) Field of Classification Search
CPC ....... G07C 5/0825; F21S 41/663; B60Q 1/48; B60Q 1/50; B60Q 2400/50
See application file for complete search history.

(56) References Cited

U.S. PATENT DOCUMENTS

| | | | | |
|---|---|---|---|---|
| 2019/0143879 A1* | 5/2019 | Krishnan | ............. | H05B 47/105 362/464 |
| 2020/0353864 A1* | 11/2020 | Niewiadomski | ....... | G06V 20/59 |

OTHER PUBLICATIONS

Martinez; Electronics inside: Fored F-150; Automotive News Jun. 28, 2021; https://www.autonews.com/technology/electronics-inside-for-f-150?utm_source=weekly&utm_medium=email&utm_campaign=20210627&utm_conte . . . .

* cited by examiner

*Primary Examiner* — Thomas M Sember
(74) *Attorney, Agent, or Firm* — Quinn IP Law

(57) ABSTRACT

A method to utilize an animation feature of a vehicle lighting member includes receiving, by a controller, sensor data indicative of a vehicle condition, determining a vehicle condition type from the sensor data, generating a control signal to control the animation feature of the vehicle lighting member based on the vehicle condition type, and controlling the animation feature of the vehicle lighting member to visually illustrate the vehicle condition type.

20 Claims, 3 Drawing Sheets

SYSTEMS FOR LIGHTING ANIMATION TO DISPLAY VEHICLE CONDITION

INTRODUCTION

The present disclosure relates generally to using vehicle lighting to communicate a vehicle condition.

Exterior vehicle lighting helps to illuminate the surrounding environment and communicate intended vehicle maneuvers, such as braking, turns, etc. Modern vehicles are equipped with animated lighting schemes to communicate an intended vehicle turn, etc. with a sequential illumination of lighting elements.

SUMMARY

Embodiments according to the present disclosure provide a number of advantages. For example, embodiments according to the present disclosure enable use of animated lighting features of a vehicle tail lamp, turn lamp, headlamp, etc. to communicate a vehicle condition. Exemplary vehicle conditions include an overall loading condition, a load distribution, etc., for example and without limitation.

In one aspect of the present disclosure, a method to utilize an animation feature of a vehicle lighting member includes receiving, by a controller, sensor data indicative of a vehicle condition and determining, by the controller, a vehicle condition type from the sensor data. The method also includes generating, by the controller, a control signal to control the animation feature of the vehicle lighting member based on the vehicle condition type and controlling, by the controller, the animation feature of the vehicle lighting member to visually illustrate the vehicle condition type.

In some aspects, the sensor data indicative of the vehicle condition includes one or more of data regarding a parking status, a trailer hitch attachment, a trailer hitch connection, a lift gate status, and a vehicle loading condition.

In some aspects, the vehicle condition type includes one or more of a mated trailer hitch connection, a tongue load, and a vehicle load.

In some aspects, wherein the vehicle lighting member includes a plurality of individual lighting elements and the control signal generated by the controller to control the animation feature of the vehicle lighting member includes an instruction to the individual lighting elements to increase an intensity of illumination to illustrate the vehicle condition type.

In some aspects, the vehicle condition type is a vehicle load, the vehicle lighting member includes a plurality of individual lighting elements, and the control signal generated by the controller to control the animation feature of the vehicle lighting member includes an instruction to the individual lighting elements to increase an intensity of illumination in proportion to the vehicle load.

In some aspects, the plurality of individual lighting elements includes a first lighting element and a second lighting element, and wherein the intensity of the illumination of the first lighting element is greater than the intensity of the illumination of the second lighting element.

In some aspects, the vehicle condition type is a vehicle load, the vehicle lighting member includes a plurality of individual lighting elements, and the control signal generated by the controller to control the animation feature of the vehicle lighting member includes an instruction to the individual lighting elements to sequentially swipe an illumination of the individual lighting elements upwards proportional to the vehicle load.

In some aspects, the method further includes determining when the parking status indicates a parked condition and when true, controlling the animation feature of the vehicle lighting member to visually illustrate the vehicle condition type.

In another aspect of the present disclosure, an automotive vehicle includes a vehicle lighting member including a plurality of individual lighting elements, a vehicle sensor configured to generate data regarding a vehicle condition, and a controller coupled to the vehicle lighting member and the vehicle sensor. The controller is configured to receive sensor data from the vehicle sensor indicative of the vehicle condition, determine a vehicle condition type from the sensor data, generate a control signal to control an animation feature of the vehicle lighting member based on the vehicle condition type, and control the animation feature of the vehicle lighting member to visually illustrate the vehicle condition type.

In some aspects, the sensor data indicative of the vehicle condition includes one or more of data regarding a parking status, a trailer hitch attachment, a trailer hitch connection, a lift gate status, and a vehicle loading condition.

In some aspects, the vehicle condition type includes one or more of a trailer hitch connection, a tongue load, and a vehicle load.

In some aspects, the control signal generated by the controller to control the animation feature of the vehicle lighting member includes an instruction to the individual lighting elements to increase an intensity of illumination to illustrate the vehicle condition type.

In some aspects, the vehicle condition type is a vehicle load and the control signal generated by the controller to control the animation feature of the vehicle lighting member includes an instruction to the individual lighting elements to increase an intensity of illumination in proportion to the vehicle load.

In some aspects, the vehicle condition type is a vehicle load and the control signal generated by the controller to control the animation feature of the vehicle lighting member includes an instruction to the individual lighting elements to sequentially swipe an illumination of the individual lighting elements upwards proportional to the vehicle load.

In another aspect of the present disclosure, a system for controlling a vehicle includes a vehicle lighting member including a plurality of individual lighting elements, a vehicle sensor configured to generate data regarding a vehicle condition, and a controller coupled to the vehicle lighting member and the vehicle sensor. The controller is configured to receive sensor data from the vehicle sensor indicative of the vehicle condition, determine a vehicle condition type from the sensor data, generate a control signal to control an animation feature of the vehicle lighting member based on the vehicle condition type, and control the animation feature of the vehicle lighting member to visually illustrate the vehicle condition type.

In some aspects, the sensor data indicative of the vehicle condition includes one or more of data regarding a parking status, a trailer hitch attachment, a trailer hitch connection, a lift gate status, and a vehicle loading condition.

In some aspects, the vehicle condition type includes one or more of a trailer hitch connection, a tongue load, and a vehicle load.

In some aspects, the control signal generated by the controller to control the animation feature of the vehicle lighting member includes an instruction to the individual lighting elements to increase an intensity of illumination to illustrate the vehicle condition type.

In some aspects, the vehicle condition type is a vehicle load and the control signal generated by the controller to control the animation feature of the vehicle lighting member includes an instruction to the individual lighting elements to increase an intensity of illumination in proportion to the vehicle load.

In some aspects, the vehicle condition type is a vehicle load and the control signal generated by the controller to control the animation feature of the vehicle lighting member includes an instruction to the individual lighting elements to sequentially swipe an illumination of the individual lighting elements upwards proportional to the vehicle load.

In some aspects, the controller is further configured to determine when the parking status indicates a parked condition and when true, control the animation feature of the vehicle lighting member to visually illustrate the vehicle condition type.

BRIEF DESCRIPTION OF THE DRAWINGS

The present disclosure will be described in conjunction with the following figures, wherein like numerals denote like elements.

Figure 1:
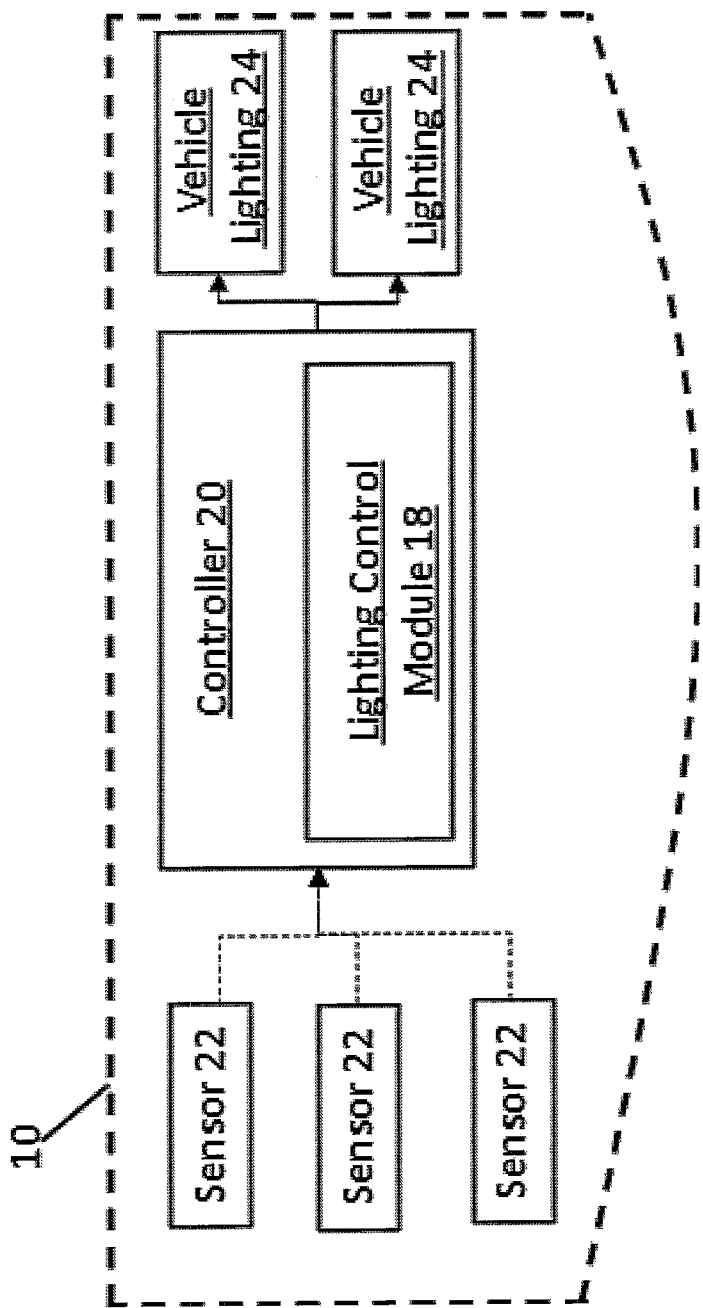
FIG. 1 is a schematic illustration of a vehicle including animated lighting control, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Referring now to FIG. 1, a part of a vehicle 10 is shown to include a lighting control module 18 that monitors and controls a lighting condition of the vehicle 10 via one or more vehicle lighting members 24. In various embodiments, the lighting control module 18 is a module of a controller 20. While depicted as a single unit for illustrative purposes, the controller 20 may additionally include one or more other controllers, collectively referred to as a "controller." The controller 20 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 20 in controlling the vehicle 10.

As can be appreciated, the vehicle 10 may be any vehicle type including an automobile, an aircraft, a train, a watercraft, a trailer, or any other vehicle type that includes vehicle lighting, such as headlamps, tail lamps, side lamps, or other external lighting. For exemplary purposes, the disclosure will be discussed in the context of the vehicle 10 being an automobile having a lighting control module 18 coupled with one or more vehicle lighting members 24. Although the figures shown herein depict an example with certain arrangements of elements, additional intervening elements, devices, features, or components may be present in an actual embodiment. It should also be understood that FIG. 1 is merely illustrative and may not be drawn to scale.

As shown in FIG. 1, the vehicle 10 generally includes at least one vehicle lighting element 24. In various embodiments, the vehicle lighting element 24 is a tail lamp, head lamp, side lamp, or other external lighting element. One or more sensors 22 sense observable conditions of the vehicle and generate sensors signals based thereon. The lighting control module 18, which, in some embodiments, is a controller or processor, receives the signals from the sensors 22 and determines a lighting animation to display using animation features of the vehicle lighting members 24. The lighting control module 18 uses the visual animation features of the vehicle lighting members 24 to selectively notify vehicles, operators of vehicles, pedestrians, etc. of a vehicle condition.

In various embodiments, the sensors 22 include a load sensor to detect a loading condition of the vehicle, a tongue weight sensor, and a pitch orientation of the vehicle and/or trailer, for example and without limitation. The sensors 22 may be standalone sensors or may be associated with other vehicle systems that communicate directly or indirectly with the lighting control module 18. The lighting control module 18 uses the signals received from the sensors 22 to generate a lighting animation control signal that is transmitted to one or more vehicle lighting members 24.

Figure 2:
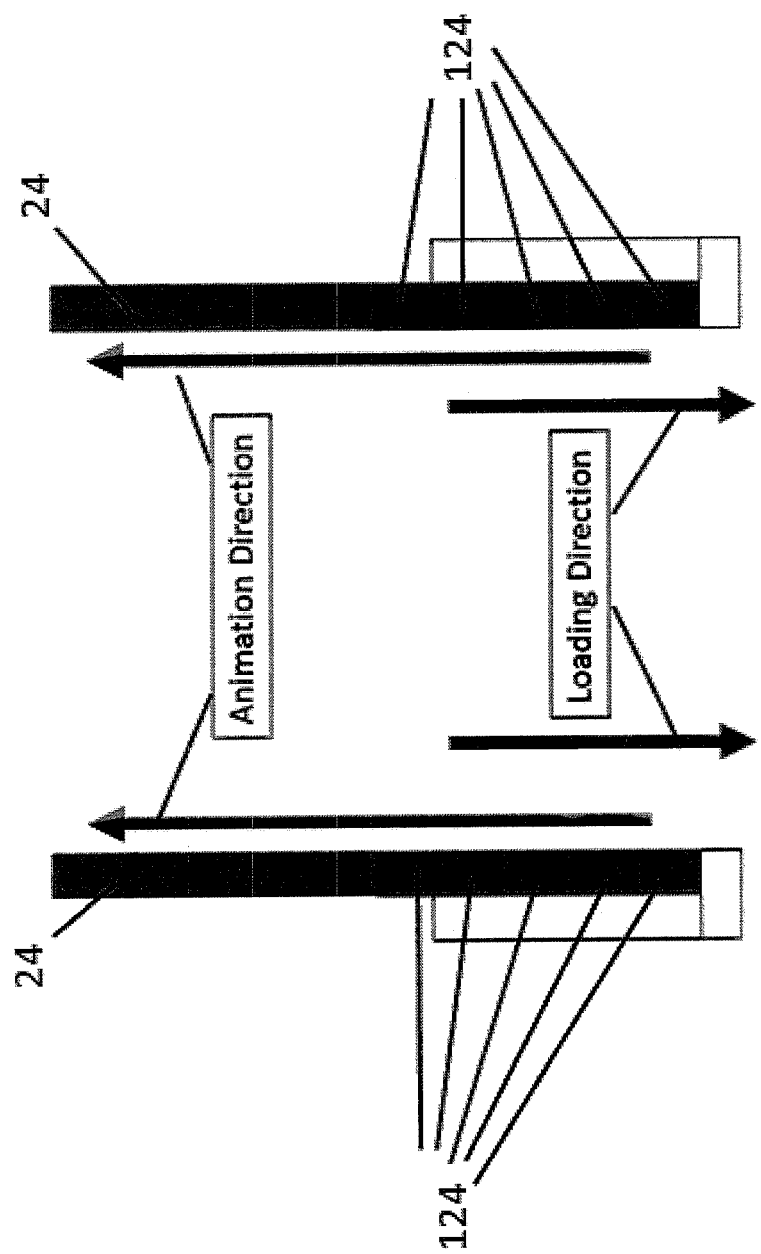
FIG. 2 is a schematic illustration of a vehicle lighting animation indicative of a vehicle condition, according to an embodiment.

Referring now to FIG. 2, and with continued reference to FIG. 1, a schematic diagram illustrates an exemplary use of the lighting control module 18 and the vehicle lighting members 24 to indicate a vehicle condition. In the illustrated embodiment, a vehicle loading condition is illustrated. However, the animation features of the vehicle lighting members 24 can be used to indicate other vehicle conditions, such as a weight distribution (left to right), a vehicle pitch (weight distribution front to back, such as when a heavy accessory, such as a snowplow, is coupled to the vehicle 10), etc., for example and without limitation.

As shown in FIG. 2, the vehicle lighting members 24 each include a plurality of individual lighting elements 124. The plurality of individual lighting elements 124 can include at least a first lighting element and a second lighting element. The individual lighting elements 124 can be controlled by the lighting control module 18 to illuminate individually to indicate a vehicle condition. In the embodiment shown in FIG. 2, the vehicle 10 is loaded with weight, such as heavy items in the vehicle trunk or a tongue weight from an attached trailer. The loading direction is indicated by the downward pointing arrows. As the vehicle load increases, as detected by one or more of the sensors 22, the lighting control module 18, in response to data received from the one or more sensors 22, generates a control signal to illuminate one or more of the plurality of individual lighting elements 124. In various embodiments, the individual lighting elements 124 are illuminated sequentially, with a greater number of illuminated individual lighting elements 124 indicating a higher load. As shown in FIG. 2, the individual lighting elements 124 are sequentially illuminated in an upward or animation direction as a direct reflection of an increased load on the vehicle 10. In other words, as the load on the vehicle 10 increases, so does the number of illuminated individual lighting elements 124. In some embodiments, an intensity of illumination of the plurality of lighting elements indicates the vehicle condition, such as the vehicle load condition. For example, the lighting control module 18 controls the intensity of illumination of a first lighting element of the plurality of individual lighting elements to a first intensity that is greater than a second intensity of illumination of a second lighting element of the plurality of individual lighting elements. While the embodiment shown in FIG. 2 illustrates illumination or animation of individual lighting elements 124 of vehicle tail lamps, it is understood that the concept of illumination or animation of individual lighting elements can be applied to any vehicle lighting member 24 having animation features.

In various embodiments, as shown in FIG. 2, the animation of the individual lighting elements 124 is symmetric. In some embodiments, the animation of the individual lighting elements 124 is asymmetric, that is, the number of illuminated lighting elements 124 on each side of the vehicle 10 is not the same. In various embodiments, an asymmetric animation or illumination of the individual lighting elements 124 indicates an uneven weight distribution, for example and without limitation.

Figure 3:
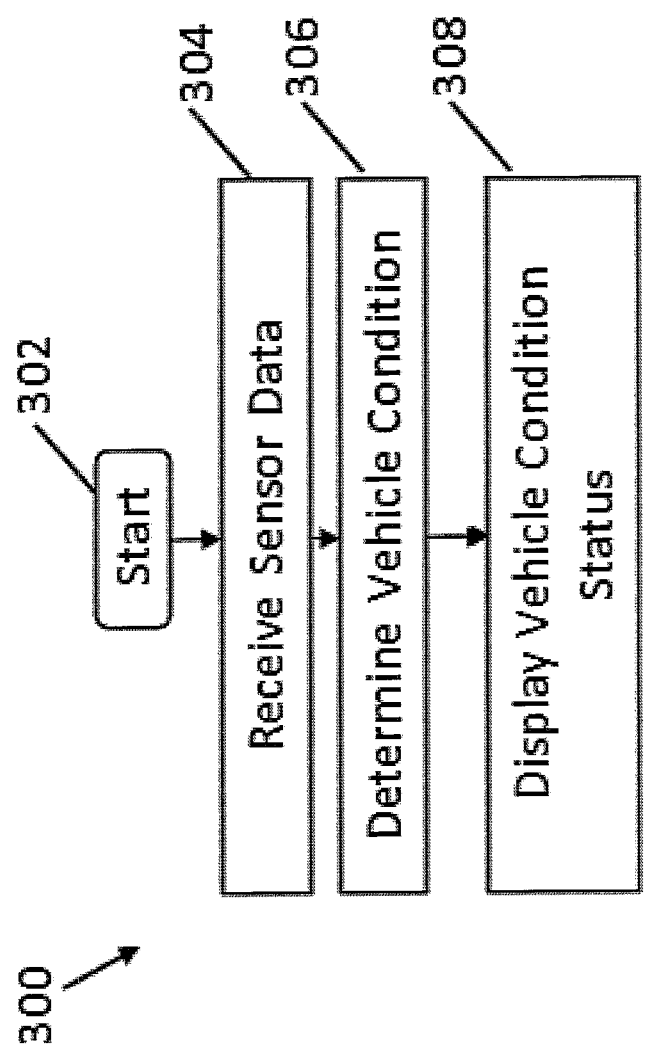
FIG. 3 is a flow diagram of a method for communicating a vehicle condition using animated lighting, according to an embodiment.

FIG. 3 illustrates a method 300 to utilize animation features of a vehicle lighting member to indicate a vehicle condition. The method 300 can be utilized in connection with the vehicle 10 including the vehicle lighting members 24. The method 300 can be utilized in connection with and/or performed by the lighting control module 18 of the controller 20 as discussed herein, or by other systems associated with or separate from the vehicle, in accordance with exemplary embodiments. The order of operation of the method 300 is not limited to the sequential execution as illustrated in FIG. 3, but may be performed in one or more varying orders, or steps may be performed simultaneously, as applicable in accordance with the present disclosure.

Beginning at 302, the method 300 proceeds to 304. At 304, the controller 20 receives sensor data from the one or more sensors 22. In various embodiments, the sensor data includes data regarding a vehicle condition, such as a parking status, a trailer hitch attachment and/or connection, a lift gate status, and a vehicle loading condition, for example and without limitation. In some embodiments, as discussed herein, the vehicle loading condition includes a weight load such as a heavy item to be transported by the vehicle, a tongue weight, etc., for example and without limitation. In various embodiments, the method 300 does not proceed beyond 304 if the vehicle is not parked or stationary.

Next, at 306, the controller 20 determines the type of vehicle condition. This includes, for example and without limitation, if the lift gate is open or closed, if the trailer hitch is attached and/or connected leading to a determination of a tongue load or weight, and if a load or weight has been loaded into the vehicle. Once the controller 20 has determined the type of vehicle condition, the method 300 proceeds to 308 and the lighting control module 18 of the controller 20 generates a control signal to control an animation feature of one or more vehicle lighting members 24 to visually illustrate the vehicle condition. In various embodiments, the control signal includes an instruction to control the individual lighting elements 124 of the vehicle lighting members 24 to increase an intensity of illumination in proportion to the data regarding the load or weight. In some embodiments, the control signal includes an instruction to the individual lighting elements 124 to sequentially swipe the illumination upwards proportional to the load weight.

As noted herein, while the examples illustrated and discussed pertain to vehicle loading conditions, it is understood that the systems and methods discussed herein can be applied to illustrate other vehicle conditions, and further that any lighting member of the vehicle equipped with animation features may be used to illustrate the vehicle condition.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method to utilize an animation feature of a vehicle lighting member, comprising:
   receiving, by a controller, sensor data indicative of a vehicle condition, wherein the sensor data includes one or more of data regarding a trailer hitch attachment and a trailer hitch connection;
   determining, by the controller, a vehicle condition type from the sensor data;
   generating, by the controller, a control signal to control the animation feature of the vehicle lighting member based on the vehicle condition type; and
   controlling, by the controller, the animation feature of the vehicle lighting member to visually illustrate the vehicle condition type, wherein the animation feature is external to the vehicle.

2. The method of claim 1, wherein the sensor data indicative of the vehicle condition includes one or more of data regarding a parking status, a lift gate status, and a vehicle loading condition.

3. The method of claim 1, wherein the vehicle condition type includes one or more of a mated trailer hitch connection, a tongue load, and a vehicle load.

4. The method of claim 1, wherein the vehicle lighting member includes a plurality of individual lighting elements and the control signal generated by the controller to control the animation feature of the vehicle lighting member includes an instruction to the individual lighting elements to increase an intensity of illumination to illustrate the vehicle condition type.

5. The method of claim 1, wherein the vehicle condition type is a vehicle load, the vehicle lighting member includes a plurality of individual lighting elements, and the control signal generated by the controller to control the animation feature of the vehicle lighting member includes an instruction to the individual lighting elements to increase an intensity of an illumination of the individual lighting elements in proportion to the vehicle load.

6. The method of claim 5, wherein the plurality of individual lighting elements includes a first lighting element and a second lighting element, and wherein the intensity of the illumination of the first lighting element is greater than the intensity of the illumination of the second lighting element.

7. The method of claim 1, wherein the vehicle condition type is a vehicle load, the vehicle lighting member includes a plurality of individual lighting elements, and the control signal generated by the controller to control the animation feature of the vehicle lighting member includes an instruction to the individual lighting elements to sequentially swipe an illumination of the individual lighting elements upwards proportional to the vehicle load.

8. The method of claim 1 further comprising determining when a parking status indicates a parked condition and when true, controlling the animation feature of the vehicle lighting member to visually illustrate the vehicle condition type.

9. An automotive vehicle, comprising:
a vehicle lighting member including a plurality of individual lighting elements;
a vehicle sensor configured to generate data regarding a vehicle condition, wherein the sensor data includes one or more of data regarding a trailer hitch attachment and a trailer hitch connection;
a controller coupled to the vehicle lighting member and the vehicle sensor, the controller configured to:
receive sensor data from the vehicle sensor indicative of the vehicle condition;
determine a vehicle condition type from the sensor data;
generate a control signal to control an animation feature of the vehicle lighting member based on the vehicle condition type; and
control the animation feature of the vehicle lighting member to visually illustrate the vehicle condition type, wherein the animation feature is external to the vehicle.

10. The automotive vehicle of claim 9, wherein the sensor data indicative of the vehicle condition includes one or more of data regarding a parking status, a lift gate status, and a vehicle loading condition.

11. The automotive vehicle of claim 9, wherein the vehicle condition type includes one or more of a trailer hitch connection, a tongue load, and a vehicle load.

12. The automotive vehicle of claim 9, wherein the control signal generated by the controller to control the animation feature of the vehicle lighting member includes an instruction to the individual lighting elements to increase an intensity of illumination to illustrate the vehicle condition type.

13. The automotive vehicle of claim 9, wherein the vehicle condition type is a vehicle load and the control signal generated by the controller to control the animation feature of the vehicle lighting member includes an instruction to the individual lighting elements to increase an intensity of illumination in proportion to the vehicle load.

14. The automotive vehicle of claim 9, wherein the vehicle condition type is a vehicle load and the control signal generated by the controller to control the animation feature of the vehicle lighting member includes an instruction to the individual lighting elements to sequentially swipe an illumination of the individual lighting elements upwards proportional to the vehicle load.

15. A system for controlling a vehicle, comprising:
a vehicle lighting member including a plurality of individual lighting elements;
a vehicle sensor configured to generate data regarding a vehicle condition, wherein the data includes one or more of data regarding a trailer hitch attachment and a trailer hitch connection;
a controller coupled to the vehicle lighting member and the vehicle sensor, the controller configured to:
receive sensor data from the vehicle sensor indicative of the vehicle condition;
determine a vehicle condition type from the sensor data;
generate a control signal to control an animation feature of the vehicle lighting member based on the vehicle condition type; and
control the animation feature of the vehicle lighting member to visually illustrate the vehicle condition type, wherein the animation feature is external to the vehicle.

16. The system of claim 15, wherein the sensor data indicative of the vehicle condition includes one or more of data regarding a parking status, a lift gate status, and a vehicle loading condition, and wherein the vehicle condition type includes one or more of a trailer hitch connection, a tongue load, and a vehicle load.

17. The system of claim 15, wherein the control signal generated by the controller to control the animation feature of the vehicle lighting member includes an instruction to the individual lighting elements to increase an intensity of illumination to illustrate the vehicle condition type.

18. The system of claim 15, wherein the vehicle condition type is a vehicle load and the control signal generated by the controller to control the animation feature of the vehicle lighting member includes an instruction to the individual lighting elements to increase an intensity of illumination in proportion to the vehicle load.

19. The system of claim 15, wherein the vehicle condition type is a vehicle load and the control signal generated by the controller to control the animation feature of the vehicle lighting member includes an instruction to the individual lighting elements to sequentially swipe an illumination of the individual lighting elements upwards proportional to the vehicle load.

20. The system of claim 15, wherein the controller is further configured to determine when a parking status indicates a parked condition and when true, control the animation feature of the vehicle lighting member to visually illustrate the vehicle condition type.

* * * * *